(12) United States Patent
Inatani (10) Patent No.: US 10,227,976 B2
(45) Date of Patent: Mar. 12, 2019

(54) HIGH-PRESSURE FUEL PUMP (71) Applicant: DENSO CORPORATION, Kariya, Aichi-pref. (JP)

(72) Inventor: Hiroki Inatani, Toyota (JP)

(73) Assignee: DENSO CORPORATION, Kariya (JP)

( * ) Notice: Subject to any disclaimer, the term of this patent is extended or adjusted under 35 U.S.C. 154(b) by 576 days.

(21) Appl. No.: 14/870,162

(22) Filed: Sep. 30, 2015

(65) Prior Publication Data

US 2016/0222960 A1 Aug. 4, 2016

(30) Foreign Application Priority Data

Jan. 29, 2015 (JP) .................................. 2015-15277

(51) Int. Cl.
| | | |
|---|---|---|
| F04B 53/14 | (2006.01) | |
| F04B 17/05 | (2006.01) | |
| F04B 9/04 | (2006.01) | |
| F04B 53/16 | (2006.01) | |
| F02M 59/10 | (2006.01) | |
| F04B 53/02 | (2006.01) | |
| F02M 59/44 | (2006.01) | |

(Continued)

(52) U.S. Cl.
CPC ......... *F04B 53/143* (2013.01); *F02M 59/102* (2013.01); *F02M 59/442* (2013.01); *F04B 1/0448* (2013.01); *F04B 9/042* (2013.01); *F04B 17/05* (2013.01); *F04B 53/02* (2013.01); *F04B 53/14* (2013.01); *F04B 53/16* (2013.01); *F02M 2200/8061* (2013.01); *F16J 9/18* (2013.01)

(58) Field of Classification Search
CPC ............... F02M 59/102; F02M 59/367; F02M 63/0225; F02M 2200/02; F02M 59/02; F02M 59/442; F02M 2200/8061; F02M 59/44; F02M 37/06; F04B 1/0421; F04B 1/0404; F04B 1/0408; F04B 1/0426; F04B 53/143; F04B 1/0448; F04B 53/18; F04B 53/16; F04B 53/14; F04B 19/22; F04B 9/042; F04B 17/05; F04B 1/0413; F16J 9/18
USPC ........................................................ 123/508
See application file for complete search history.

(56) References Cited

U.S. PATENT DOCUMENTS

2006/0104843 A1 * 5/2006 Inoue .................... F04B 1/0408
417/490
2008/0019853 A1 1/2008 Hashida et al.
(Continued)

FOREIGN PATENT DOCUMENTS

| JP | 2010-190105 A | 9/2010 |
|---|---|---|
| JP | 2011-080391 A | 4/2011 |

(Continued)

*Primary Examiner* — Charles G Freay (57) ABSTRACT

A pump body includes a pump inserted portion inserted in a pump mount hole. A cylinder has a compression chamber at one end side and opens in an end surface of the pump inserted portion at the other end side. A plunger is actuated by a cam and is movable in the cylinder. A seal member restricts fuel in the compression chamber to leak through a slidable gap between the plunger and the cylinder and restricts lubricating oil flowing through the slidable gap into the compression chamber. A retaining member retains the seal member at a predetermined position in the axial direction and restricts the plunger from falling out of the cylinder. The retaining member is press-fitted to an end of the pump inserted portion.

12 Claims, 5 Drawing Sheets

(51) Int. Cl.
*F04B 1/04* (2006.01)
*F16J 9/18* (2006.01)

(56) References Cited

U.S. PATENT DOCUMENTS

| | | | |
|---|---|---|---|
| 2008/0056914 A1 | 3/2008 | Usui et al. | |
| 2009/0110575 A1 | 4/2009 | Munakata et al. | |
| 2009/0178652 A1 | 7/2009 | Yamada et al. | |
| 2012/0195780 A1* | 8/2012 | Matsumoto | F04B 1/0404 417/559 |
| 2012/0199103 A1 | 8/2012 | Hashida et al. | |

FOREIGN PATENT DOCUMENTS

| | | | |
|---|---|---|---|
| JP | 2011-220200 A | 11/2011 | |
| JP | 2013-050081 A | 3/2013 | |
| JP | 2014-077361 A | 5/2014 | |
| WO | WO 2016062431 A1 * | 4/2016 | F04B 1/0408 |

* cited by examiner

HIGH-PRESSURE FUEL PUMP

CROSS REFERENCE TO RELATED APPLICATION

This application is based on reference Japanese Patent Application No. 2015-015277 filed on Jan. 29, 2015, the disclosure of which is incorporated herein by reference.

TECHNICAL FIELD

The present disclosure relates to a high-pressure fuel pump to pressurize and pressure-feed fuel.

BACKGROUND

Conventionally, a known high-pressure fuel pump may be directly equipped to an engine. For example, Patent Document 1 discloses a high-pressure fuel pump including a pump body and a plunger. The plunger is inserted in a cylinder of the pump body and is actuated by a cam, which is equipped to a shaft on the side of the engine, to move back and forth in the cylinder. The shaft on the side of the engine is, for example, a crankshaft, a valve camshaft, or the like. The fuel pump, which pressure-feeds high-pressure fuel, may be lubricated with oil to enhance robustness of a drive train. It is noted that, in a case where leakage of fuel and/or suction of oil occurs through a slidable gap between the cylinder and the plunger, lubricity of oil may be impaired, and/or fuel property may be degraded. Therefore, a high-pressure fuel pump having an oil-lubricating configuration may be equipped with a seal member to restrict leakage of fuel and/or suction of oil. In addition, a high-pressure fuel pump, which is configured to be directly equipped to an engine, may desirably have a configuration to avoid fallout of a plunger from a cylinder when the high-pressure fuel pump is mounted onto the engine.

Patent Document 1

Publication of unexamined Japanese patent application No. 2014-077361

The high-pressure fuel pump disclosed in Patent Document 1 has the following structure. Specifically, a seal member is equipped to an outer circumferential periphery of a portion of the plunger, which is projected from a lower end surface of a pump body toward the cam. In addition, a seal element, which retains the seal member, is fitted to a recessed portion, which is formed in the pump body. Furthermore, the seal element is fixed to the pump body by welding. In addition, a plunger stopper is equipped to restrict the plunger from falling out of the cylinder. The plunger stopper is fitted to a fitting hole, which is formed in a lower end of the pump body. It is noted that, in the above-described configuration, a complicated manufacturing may be required on the pump body to form the recessed portion, which is fitted with the seal element, and the fitting hole, which is mounted with the plunger stopper. In addition, in the above-described configuration, the seal element is fixed to the pump body by welding. Therefore, deformation may occur in the pump body.

SUMMARY

It is an object of the present disclosure to produce a high-pressure fuel pump configured to enable to equip a seal member and to avoid fallout of a plunger, without complicated manufacturing on a pump body.

According to an aspect of the present disclosure, a high-pressure fuel pump comprises a pump body including a pump inserted portion, which is configured to be inserted in a pump mount hole on a side of an engine. The high-pressure fuel pump further comprises a cylinder extending in an axial direction of the pump body. The cylinder has a compression chamber at one end side in the axial direction. The cylinder opens in an axial end surface of the pump inserted portion at an other end side in the axial direction. The high-pressure fuel pump further comprises a plunger inserted in the cylinder. The plunger is configured to be actuated by a cam, which is equipped to a shaft on the side of the engine, and movable back and forth in the cylinder. The high-pressure fuel pump further comprises a seal member configured to restrict fuel in the compression chamber from leaking through a slidable gap, which is between the plunger and the cylinder, to the side of the engine. The seal member is further configured to restrict lubricating oil on the side of the engine from flowing through the slidable gap into the compression chamber. The high-pressure fuel pump further comprises a retaining member configured to retain the seal member at a predetermined position in the axial direction and to restrict directly or indirectly the plunger from falling out of the cylinder when being mounted to the side of the engine. The retaining member is press-fitted to an end of the pump inserted portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described in detail.

EMBODIMENTS

First Embodiment

Figure 1:
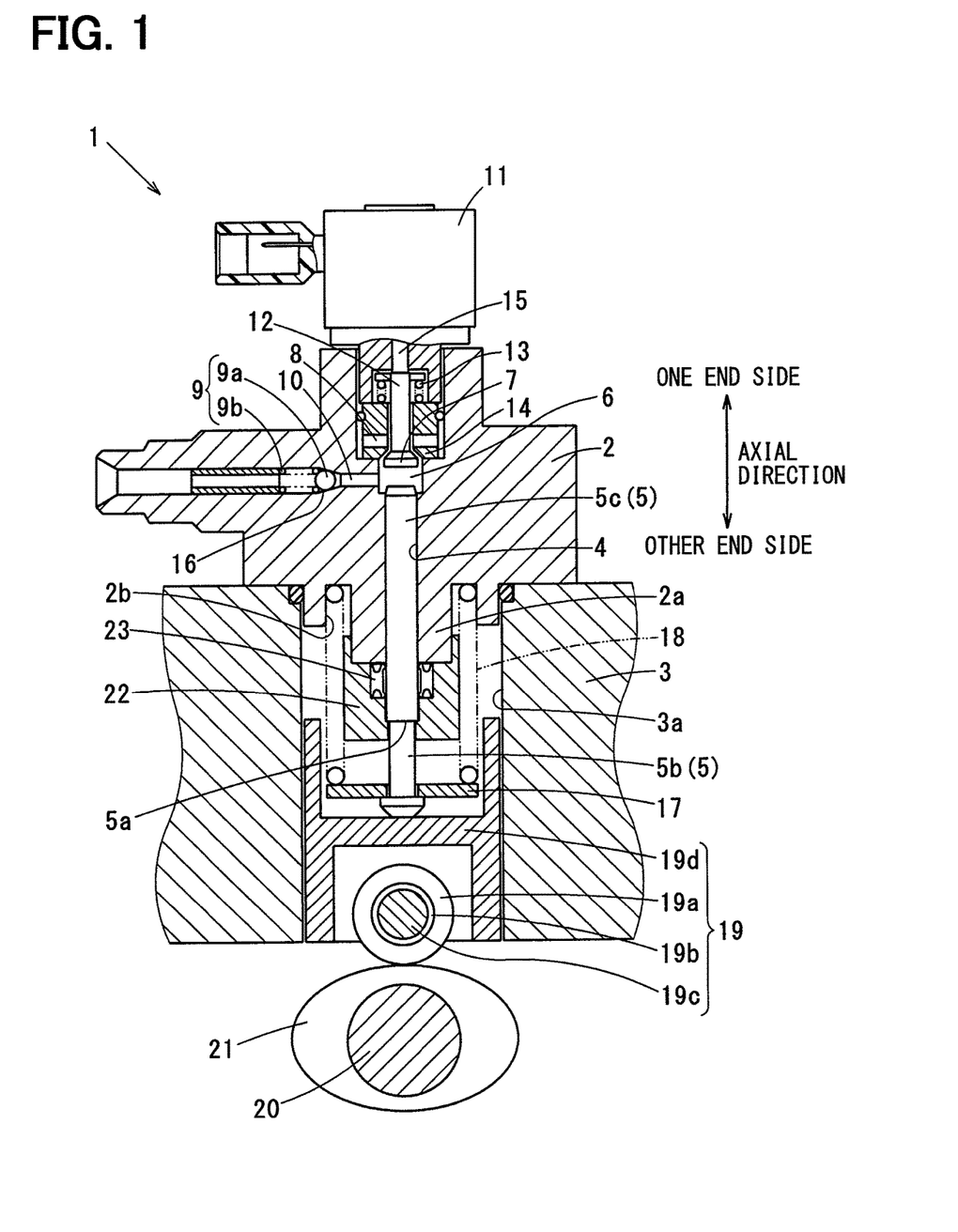
FIG. 1 is a sectional view showing a high-pressure fuel pump according to a first embodiment.

As shown in FIG. 1, a high-pressure fuel pump 1 includes a pump body 2 mounted on a side of an engine. The pump body 2 has a pump inserted portion 2a as a part of the pump body 2. The pump inserted portion 2a is inserted in a pump mount hole 3a on the side of the engine. The pump mount hole 3a is in, for example, a tubular shape and is formed in an engine block 3. The pump body 2 has a cylinder hole (cylinder) 4 extended in an axial direction, which is along the vertical direction in FIG. 1. A plunger 5 is inserted in a cylinder 4 and is slidable in the cylinder 4. The cylinder 4 has a compression chamber 6 on one end side in the axial direction. The cylinder 4 has an opening on the other end side in the axial direction. The opening of the cylinder 4 opens in an end surface of the pump inserted portion 2a. The compression chamber 6 is connected with an intake passage 8 and a discharge passage 10. The intake passage 8 is opened and closed by an intake valve 7. The discharge passage 10 is opened and closed by a discharge valve 9.

The intake valve 7 opens and closes the intake passage 8 in response to an ON-and-OFF operation of an electromagnetic solenoid 11. Specifically, when the electromagnetic solenoid 11 is not energized (OFF), a counter force of a first spring (not shown) accommodated in the electromagnetic solenoid 11 overcomes a counter force of a second spring 13 working on a valve rod 12. Thus, the intake valve 7 is lifted from a seat surface 14 to open the intake passage 8. To the contrary, when the electromagnetic solenoid 11 is energized (ON), a plunger rod 15 moves upward against the counter force of the first spring. Therefore, the intake valve 7 is seated onto the seat surface 14 by the counter force of the second spring 13 thereby to close the intake passage 8. The discharge valve 9 includes a valve element 9a and a spring 9b. The valve element 9a is configured to be seated onto a conical seat surface 16, which is formed in the discharge passage 10, and closes the discharge passage 10. The spring 9b biases the valve element 9a toward the seat surface 16. When a fuel pressure in the compression chamber 6 increases to be greater than a predetermined pressure, the valve element 9a is lifted from the seat surface 16 against the biasing force of the spring 9b. Thus, the discharge valve 9 opens the discharge passage 10.

The plunger 5 is projected from an interior of the cylinder 4 on the other end side. The plunger 5 includes a small-diameter tubular portion 5b on the other end side. The small-diameter tubular portion 5b is reduced in outer diameter to form a step 5a. The one end side of the plunger 5 beyond the step 5a in the axial direction forms a plunger sliding portion 5c. The plunger 5 is equipped with a lower seat 17 at the end of the small-diameter tubular portion 5b. The counter force of a plunger spring 18 works on the lower seat 17 to bias the lower seat 17 toward a tappet 19. One end side of the plunger spring 18 is accommodated in a guide hole 2b in an annular shape. The guide hole 2b is formed in the pump inserted portion 2a. A spring end surface of the plunger spring 18 on the one end side is supported by a bottom surface of the guide hole 2b The other spring end surface of the plunger spring 18 on the other end side is supported by the lower seat 17.

The tappet 19 includes a roller 19a, a tappet axis 19c, and a tappet body 19d. The roller 19a is in contact with an outer periphery of a cam 21, which is equipped to a shaft 20. The tappet axis 19c rotationally supports the roller 19a via a bush 19b. The tappet body 19d is in a tubular shape and supports both ends of the tappet axis 19c. An outer circumferential periphery of the tappet body 19d is slidably fitted to an inner circumferential periphery of the pump mount hole 3a. The shaft 20 may be a shaft equipped on the side of the engine. The shaft 20 may be, for example, a crankshaft or a valve camshaft. As the shaft 20 rotates, the roller 19a rotates on the outer circumferential periphery of the cam 21, and the tappet body 19d moves on the inner circumferential periphery of the pump mount hole 3a in the axial direction. Thus, the tappet 19 converts a rotary motion of the cam 21 into a linear motion and transmits the converted linear motion to the plunger 5.

Figure 2:
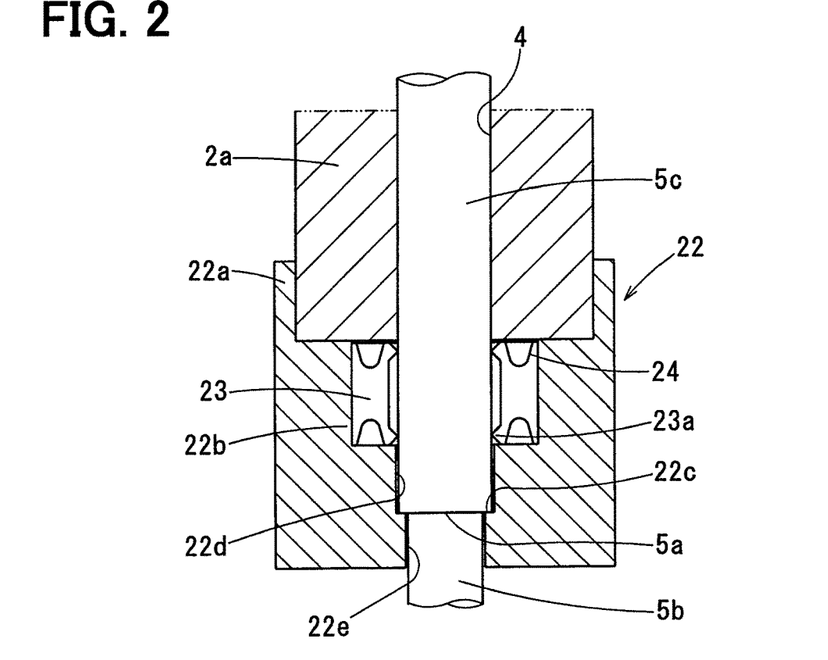
FIG. 2 is a sectional view showing a retaining member and a peripheral configuration of the retaining member according to the first embodiment.

A portion of the plunger sliding portion 5c is projected from the end surface of the pump inserted portion 2a toward the cam 21. A seal member 23 is located between an outer circumferential periphery of the portion of the plunger sliding portion 5c and a retaining member 22. As follows, details of the seal member 23 will be described. The seal member 23 restricts fuel in the compression chamber 6 from leaking to the side of the engine through a slidable gap between the cylinder 4 and the plunger 5. In addition, the seal member 23 restricts lubricating oil on the side of the engine from flowing into the compression chamber 6 through the slidable gap. Thus, the seal member 23 restricts suction of lubricating oil. The seal member 23 is formed of a material, which enables to reduce friction on the plunger 5. The seal member 23 is formed of, for example, PTFE (tetrafluoroethylene resin). As shown in FIG. 2, the seal member 23 is in a ring shape and has an inner circumferential periphery equipped with a lip 23a. In addition, a blade spring 24 is equipped to an interior of the seal member 23. The blade spring 24 has resilience working on the lip 23a to bias the lip 23a onto the outer circumferential periphery of the plunger 5. The retaining member 22 is affixed to an end of the pump inserted portion 2a to retain the seal member 23. In addition, the retaining member 22 restricts the plunger 5 from falling out of the cylinder 4 when the high-pressure fuel pump 1 is mounted to the side of the engine side, specifically, for example, when the pump inserted portion 2a is inserted into the pump mount hole 3a. Thus, the retaining member 22 functions to avoid fallout of the plunger 5.

As shown in FIG. 2, the retaining member 22 is in a tubular shape. Specifically, the retaining member 22 reduces in an inner diameter stepwise from the one end side on the upper side in the drawing toward the other end side in the axial direction. A press-fitting tubular portion 22a is formed in the retaining member 22 on the one end side, in which the inner diameter of the retaining member 22 is the largest. The press-fitting tubular portion 22a is press-fitted onto the outer circumferential periphery of the pump inserted portion 2a and is fixed to the pump inserted portion 2a. A plunger sealing portion 22b is formed in a portion of the retaining member 22 on the other end side beyond the press-fitting tubular portion 22a in the axial direction. The plunger sealing portion 22b has an inner diameter, which is substantially the same as an outer diameter of the seal member 23. An annular sealing space is formed between the inner circumferential periphery of the plunger sealing portion 22b and the outer circumferential periphery of the plunger sliding portion 5c. The seal member 23 is located in the annular sealing space. An outer periphery of the seal member 23 is applied with resilience of the blade spring 24 and is tightly in contact with to the inner circumferential periphery of the plunger sealing portion 22b. In addition, the lip 23a equipped on the inner circumferential periphery of the seal member 23 is biased onto the outer periphery of the plunger sliding portion 5c. The lip 23a has a predetermined compression margin with the outer periphery of the plunger sliding portion 5c. A stepped portion 22c is formed on a portion of the retaining member 22 on the other end side beyond the plunger sealing portion 22b in the axial direction. The stepped portion 22c is fitted to the step 5a, which is formed on the outer circumferential periphery of the plunger 5. The stepped portion 22c is formed between an insertion hole 22d and a small-diameter hole 22e. The plunger sliding portion 5c is inserted in the insertion hole 22d and is slidable on the insertion hole 22d. The small-diameter tubular portion 5b is inserted in the small-diameter hole 22e and is slidable on the small-diameter hole 22e. The stepped portion 22c is latched onto the step 5a of the plunger 5 thereby to avoid fallout of the plunger 5.

Subsequently, an operation of the high-pressure fuel pump 1 will be described. The plunger 5 is at a top dead center when being at a maximum movable position, after the plunger 5 moves inside the cylinder 4 from the other end side to the one end side with the rotary motion of the cam 21. The plunger 5 is at a bottom dead center when being at a maximum movable position, after the plunger 5 moves inside the cylinder 4 from the one end side to the other end side with the rotary motion of the cam 21.

1) Suction Stroke of Fuel

In a condition where the electromagnetic solenoid 11 is not energized to open the intake valve 7, the plunger 5 moves inside the cylinder 4 from the top dead center toward the bottom dead center. In this state, pressure in the compression chamber 6 decreases to draw fuel, which is supplied from a low-pressure pump (not shown), through the intake passage 8 into the compression chamber 6.

2) Discharge Stroke of Fuel

After the plunger 5 reaches the bottom dead center, the plunger 5 starts to move inside the cylinder 4 from the bottom dead center toward the top dead center. In this state, the electromagnetic solenoid 11 is energized in response to a required discharge quantity of fuel. The intake valve 7 closes in response to the energization of the electromagnetic solenoid 11. Thus, fuel in the compression chamber 6 is pressurized with movement of the plunger 5. In this way, pressure of fuel in the compression chamber 6 is increased. When fuel pressure in the compression chamber 6 increases to be greater than a predetermined pressure, the discharge valve 9 opens. The predetermined pressure is higher than a valve opening pressure of the discharge valve 9. Thus, fuel in the compression chamber 6 is discharged through the discharge passage 10. Fuel discharged from the high-pressure fuel pump 1 is pressure-accumulated in, for example, a common rail. Thus, the pressure-accumulated fuel is supplied to injectors, which are equipped to cylinders of the engine, respectively.

Operation and Effect of First Embodiment

1) The high-pressure fuel pump 1 according to the first embodiment may enable to retain the seal member 23 and to avoid fallout of the plunger 5 with the retaining member 22 being a singular component. Therefore, the number of components may be reduced compared with a conventional configuration such as Patent Document 1.

2) The seal member 23 is located in the annular sealing space. The annular sealing space is formed between the inner circumferential periphery of the plunger sealing portion 22b of the retaining member 22 and the outer circumferential periphery of the plunger sliding portion 5c. Therefore, another plunger sealing portion need not be formed in the pump body 2. That is, the present configuration may omit a manufacturing process to form a plunger sealing portion in the pump body 2. In addition, the retaining member 22 is press-fitted to the end of the pump inserted portion 2a. Therefore, the present configuration need not a complicated manufacturing for fixing the retaining member 22 to the pump body 2. Thus, the present configuration may enable to reduce the manufacturing cost. Furthermore, welding is not implemented to fix the retaining member 22 to the pump body 2. Therefore, the pump body 2 can be protected from thermal deformation caused by welding.

3) The present configuration employs the plunger sealing portion 22b in the retaining member 22. That is, the present configuration does not form a plunger sealing portion in the pump body 2. Therefore, the present configuration may facilitate to form a fuel circuit in the pump body 2 for recovering fuel, which leaks from the compression chamber 6 into the slidable gap between the cylinder 4 and the plunger 5.

As follows, other embodiments of the present disclosure will be described.

Second Embodiment

Figure 3:
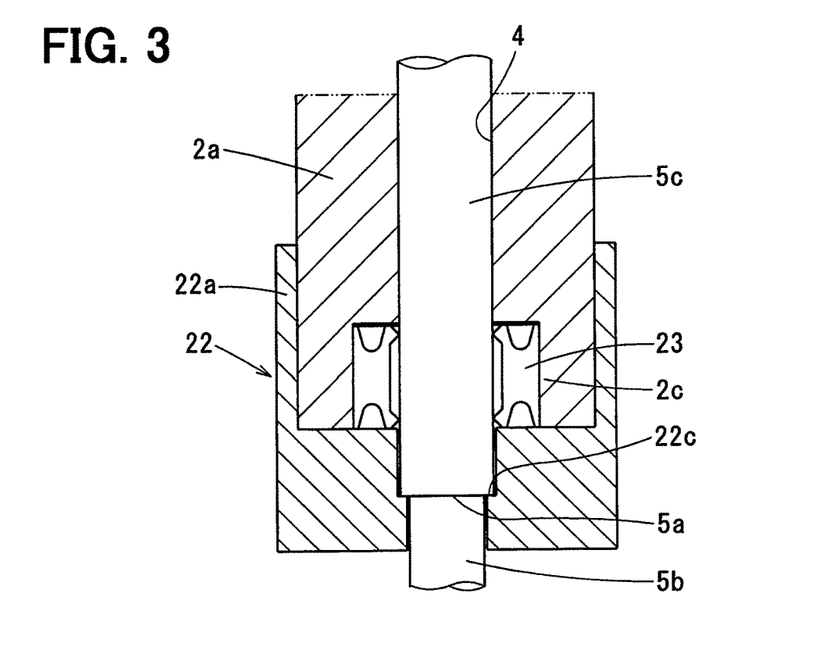
FIG. 3 is a sectional view showing a retaining member and a peripheral configuration of the retaining member according to a second embodiment.

As shown in FIG. 3, the second embodiment employs a configuration in which a plunger sealing portion 2c is formed in an end of the pump inserted portion 2a. Specifically, an annular sealing space is formed between an inner circumferential periphery of the plunger sealing portion 2c and the outer circumferential periphery of the plunger sliding portion 5c. The seal member 23 is located in the annular sealing space. Similarly to the first embodiment, the tubular portion 22a of the retaining member 22 is press-fitted to the outer circumferential periphery of the pump inserted portion 2a. More specifically, the tubular portion 22a is affixed on the radially outside of the plunger sealing portion 2c.

In the configuration according to the second embodiment, the tubular portion 22a of the retaining member 22 is press-fitted to the outer circumferential periphery of the plunger sealing portion 2c. In addition, the seal member 23 is located on the radially inside of the plunger sealing portion 2c. Therefore, the present configuration may enable to reduce an influence, which is caused by press-fitting the retaining member 22 to the pump inserted portion 2a and exerted on the slidable gap between the cylinder 4 and the plunger 5. Similarly to the first embodiment, the stepped portion 22c, which is formed on the inner circumferential periphery of the retaining member 22, is fitted to the step 5a, which is formed on the outer circumferential periphery of the plunger 5. Thus, the present configuration functions to avoid fallout of the plunger 5.

Third Embodiment

Figure 4:
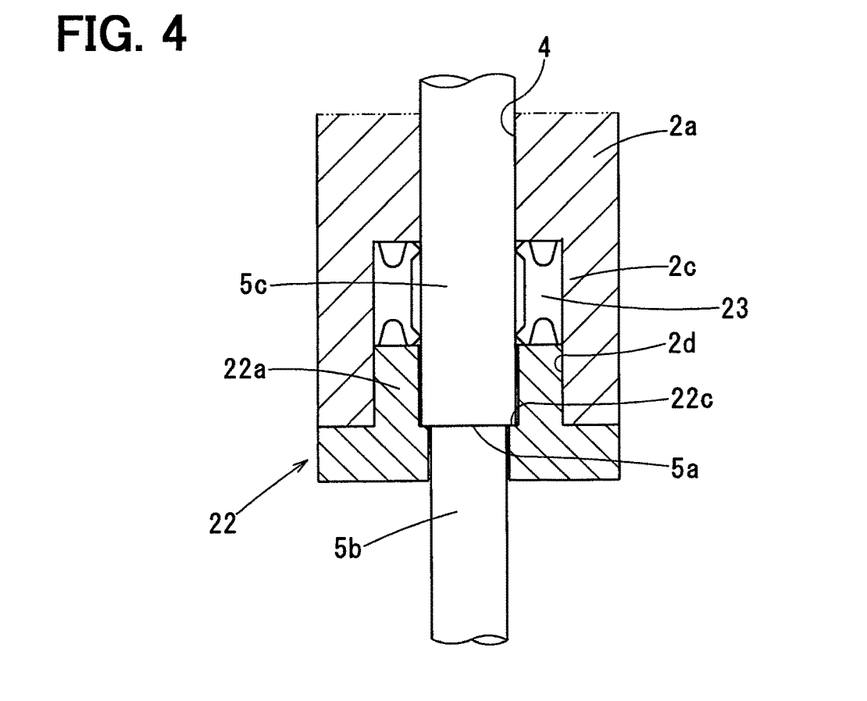
FIG. 4 is a sectional view showing a retaining member and a peripheral configuration of the retaining member according to a third embodiment.

As shown in FIG. 4, the configuration according to the third embodiment employs the plunger sealing portion 2c formed in the end of the pump inserted portion 2a. In addition, a tubular portion 22a of the retaining member 22 is press-fitted to an inner circumferential periphery of a portion of the pump inserted portion 2a. The portion of the pump inserted portion 2a is located on the other end side relative to the plunger sealing portion 2c. The pump inserted portion 2a has an enlarged diameter hole 2d, which opens in an end surface of the pump inserted portion 2a in the axial direction. The enlarged diameter hole 2d has an inner diameter, which is substantially the same as an outer diameter of the seal member 23. The plunger sealing portion 2c is formed on a radially outside of the one end side of the enlarged diameter hole 2d. Similarly to the second embodiment, the annular sealing space is formed between the inner circumferential periphery of the enlarged diameter hole 2d of the plunger sealing portion 2c and the outer circumferential periphery of the plunger sliding portion 5c. The seal member 23 is located in the annular sealing space. The press-fitting tubular portion 22*a* is formed on the radially inside in the retaining member 22. The press-fitting tubular portion 22*a* is press-fitted into the inner circumferential periphery of the other end side of the enlarged diameter hole 2*d*.

In the configuration of the present third embodiment, the outer diameter of the press-fitting tubular portion 22*a*, which is formed on the retaining member 22, may be the same as the outer diameter of the seal member 23. In this case, the inner diameter of the enlarged diameter hole 2*d* formed in the pump inserted portion 2*a* may be constant at the same dimension from the one end side to the other end side. That is, the inner diameter of the enlarged diameter hole 2*d* in the portion, at which the seal member 23 is located, may not be differed from the inner diameter of the enlarged diameter hole 2*d* in the portion, in which the press-fitting tubular portion 22*a* is press-fitted. Therefore, the present configuration may enable to form the enlarged diameter hole 2*d*, which is a precisely manufactured portion, selectively at one region. Therefore, the present configuration may facilitate manufacturing of the pump body 2. In addition, the press-fitting tubular portion 22*a* of the retaining member 22 is press-fitted into the inner circumferential periphery of the enlarged diameter hole 2*d* of the pump inserted portion 2*a*. Thus, the press-fitting tubular portion 22*a* is located on the radially inside of the pump inserted portion 2*a*. The configuration may enable to enlarge the inner diameter of the cylinder 4 slightly toward the other end side. Therefore, the sliding portion between the cylinder 4 and the plunger 5 may be formed not to cause seizure. Similarly to the first embodiment, the stepped portion 22*c*, which is formed on the inner circumferential periphery of the retaining member 22, is fitted to the step 5*a*, which is formed on the outer circumferential periphery of the plunger 5. Thus, the present configuration functions to avoid fallout of the plunger 5.

Fourth Embodiment

Figure 5:
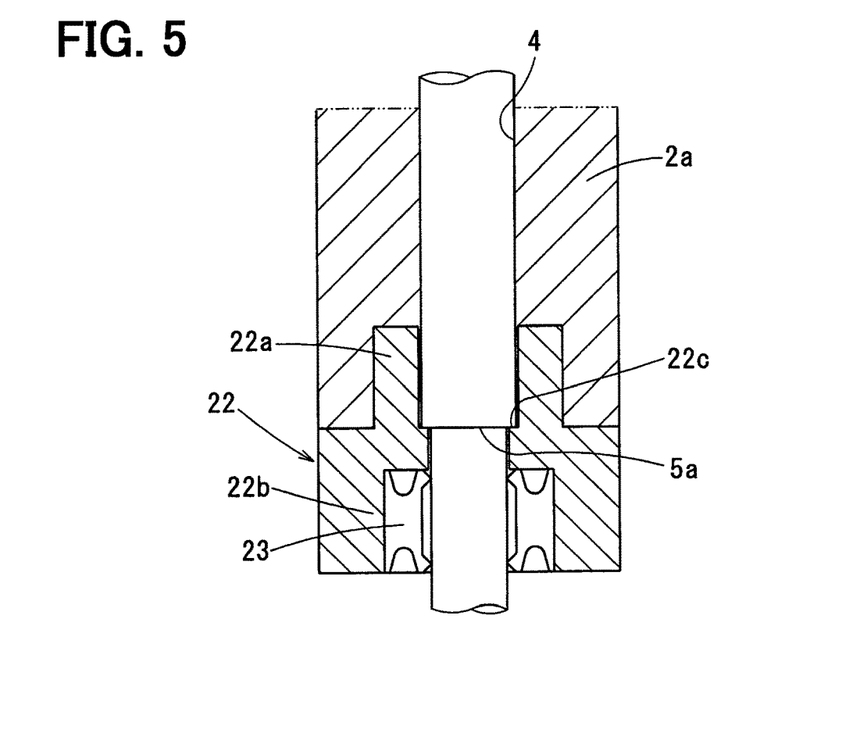
FIG. 5 is a sectional view showing a retaining member and a peripheral configuration of the retaining member according to a fourth embodiment.

As shown in FIG. 5, the fourth embodiment employs the retaining member 22 having the plunger sealing portion 22*b*. In addition, the press-fitting tubular portion 22*a* of the retaining member 22 is located on the radially inside of the pump inserted portion 2*a*. The retaining member 22 has the plunger sealing portion 22*b* on the other end side in the axial direction and has the press-fitting tubular portion 22*a* on the one end side in the axial direction. The annular sealing space is formed between an inner circumferential periphery of the plunger sealing portion 22*b* and an outer circumferential periphery of the plunger sliding portion 5*c*. The seal member 23 is located in the annular sealing space. The seal member 23 is biased onto the inner circumferential periphery of the plunger sealing portion 22*b* so that the seal member 23 does not fallout of the annular sealing space downward in the drawing. The configuration of the present fourth embodiment may not need to retain the seal member 23 between the pump body 2 and the retaining member 22. Therefore, even in a configuration in which the tubular portion 22*a* is press-fitted to the radially inside of the pump inserted portion 2*a*, manufacturing of the pump body 2 can be reduced to a small quantity. Similarly to the first embodiment, the stepped portion 22*c*, which is formed on the inner circumferential periphery of the retaining member 22, is fitted to the step 5*a*, which is formed on the outer circumferential periphery of the plunger 5. Thus, the present configuration functions to avoid fallout of the plunger 5.

Figure 6:
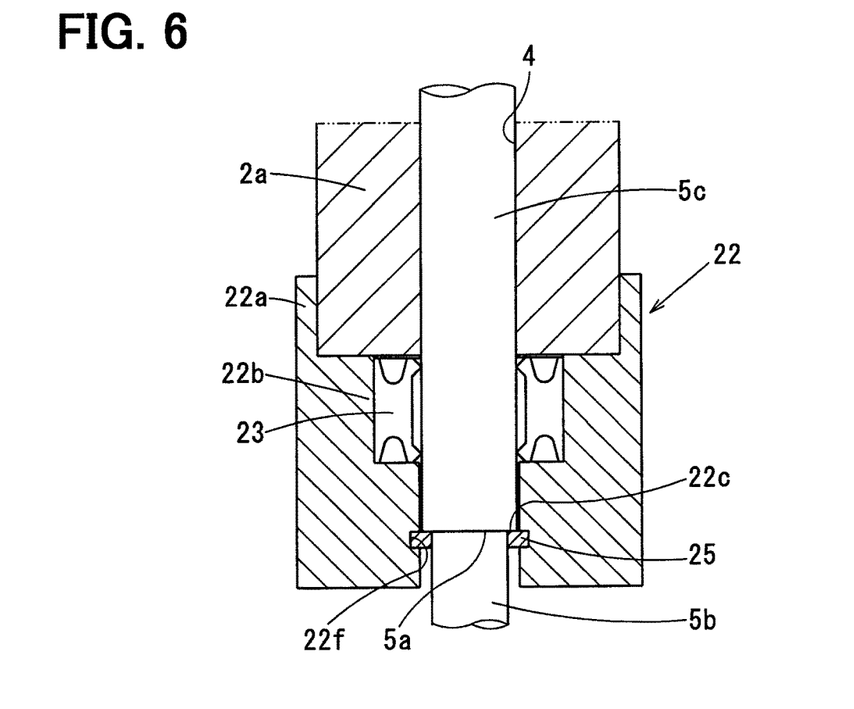
FIG. 6 is a sectional view showing a retaining member and a peripheral configuration of the retaining member according to a fifth embodiment.
Figure 7:
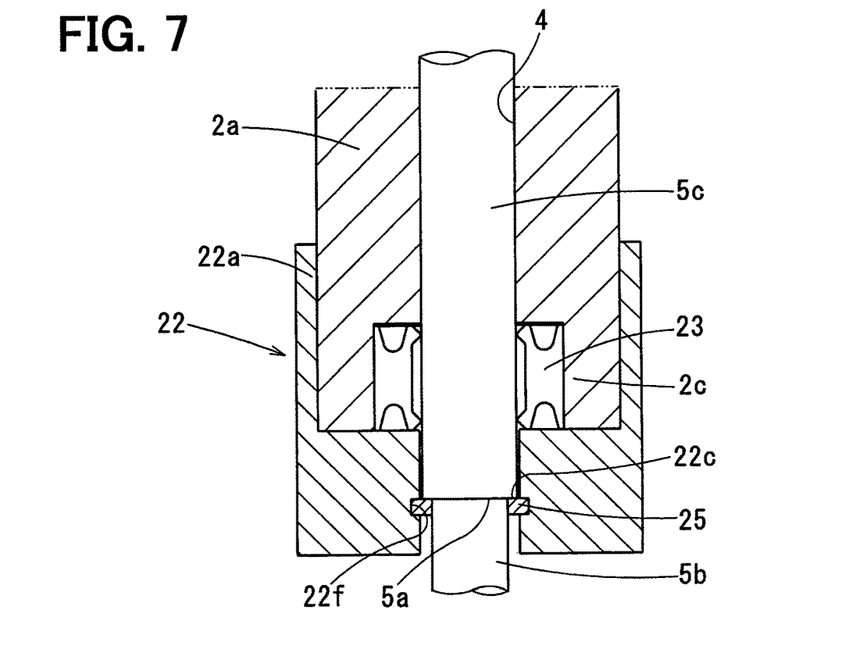
FIG. 7 is a sectional view showing a retaining member and a peripheral configuration of the retaining member according to a sixth embodiment.
Figure 8:
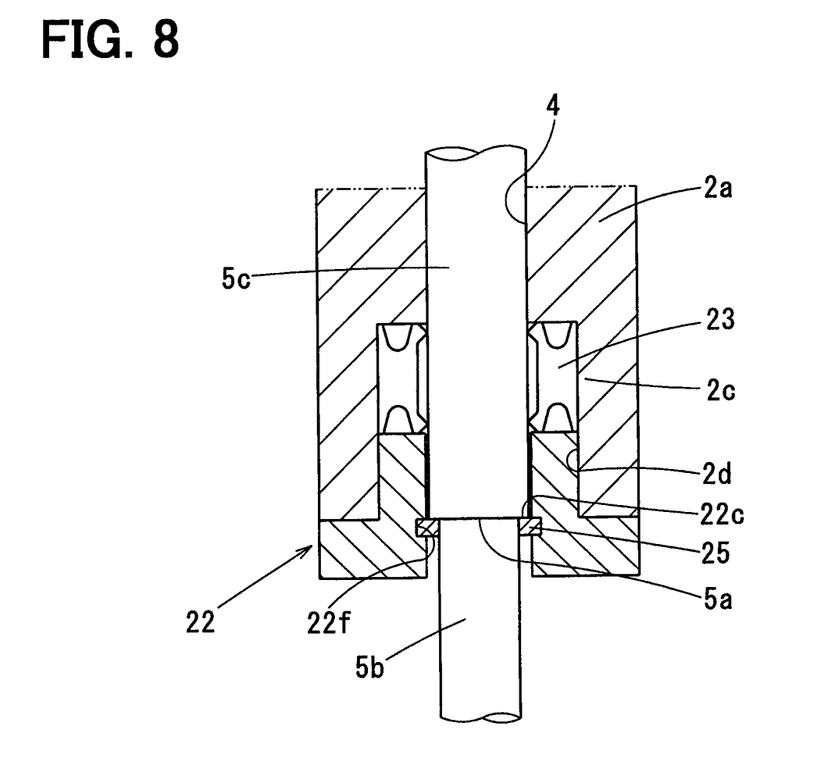
FIG. 8 is a sectional view showing a retaining member and a peripheral configuration of the retaining member according to a seventh embodiment.

In each of the following fifth embodiment to seventh embodiment, the retaining member 22, together with a snap ring 25, functions to avoid fallout of the plunger 5.

Fifth Embodiment

As shown in FIG. 6, the retaining member 22 according to the fifth embodiment has an annular groove 22*f* and does not have the stepped portion 22*c* exemplified in the first embodiment. The snap ring 25 is equipped to the annular groove 22*f*. The retaining member 22 avoids fallout of the plunger 5 via the snap ring 25. The configuration of the press-fitting tubular portion 22*a* and the plunger sealing portion 22*b* of the retaining member 22 is equivalent to those in the first embodiment. The configuration of the present embodiment, excluding the configuration to avoid fallout of the plunger 5 by utilizing the snap ring 25, may produce an effect similarly to the first embodiment.

Sixth Embodiment

As shown in FIG. 7, the retaining member 22 according to the sixth embodiment has the annular groove 22*f* on the radially inside, and does not have the stepped portion 22*c* exemplified in the second embodiment. The snap ring 25 is equipped to the annular groove 22*f*. The retaining member 22 avoids fallout of the plunger 5 via the snap ring 25. The configuration of the press-fitting tubular portion 22*a* of the retaining member 22 and the plunger sealing portion 2*c* of the pump inserted portion 2*a* is equivalent to those in the second embodiment. The configuration of the present embodiment, excluding the configuration to avoid fallout of the plunger 5 by utilizing the snap ring 25, may produce an effect similarly to the second embodiment.

Seventh Embodiment

As shown in FIG. 8, the retaining member 22 according to the seventh embodiment has the annular groove 22*f* on the radially inside, and does not have the stepped portion 22*c* exemplified in the third embodiment. The snap ring 25 is equipped to the annular groove 22*f*. The retaining member 22 avoids fallout of the plunger 5 via the snap ring 25. The configuration of the press-fitting tubular portion 22*a* of the retaining member 22 and the plunger sealing portion 2*c* of the pump inserted portion 2*a* is equivalent to those in the third embodiment. The configuration of the present embodiment, excluding the configuration to avoid fallout of the plunger 5 by utilizing the snap ring 25, may produce an effect similarly to the third embodiment.

Modification

The seal member 23 described in the first embodiment is formed of PTFE (tetrafluoroethylene resin) in the ring shape and is formed to accommodate the blade spring 24. It is noted that, the configuration is not limited to the exemplified one. For example, the seal member may be formed with a combination of a ring-shaped member formed of PTFE and an O-ring, which is formed of rubber and located on the radially outside of the ring-shaped member.

The high-pressure pump of the present disclosure may include a pump body, a cylinder, a plunger, a seal member, and a retaining member. The pump body includes the pump inserted portion, which is inserted in the pump mount hole on the side of the engine. The cylinder is formed to extend in the axial direction of the pump body. The cylinder forms a compression chamber on the one end side in the axial direction and opens in the axial end surface of the pump inserted portion on the other-end side in the axial direction. The plunger is inserted in the cylinder and is configured to be actuated by the camshaft on the side of the engine to move back and forth inside the cylinder. The seal member restricts fuel in the compression chamber from leaking to the engine side through the slidable gap between the cylinder and the plunger and restricts lubricating oil on the side of the engine from flowing into the compression chamber through the slidable gap. The retaining member retains the seal member at the predetermined position in the axial direction and directly or indirectly restricts the plunger from falling out of the cylinder when being mounted to the side of the engine. The retaining member is press-fitted to the end of the pump inserted portion.

The present configuration need not welding of the retaining member to the pump body. Therefore, the present configuration may protect the pump body from deformation. In addition, the retaining member is fixed to the end of the pump inserted portion by press-fitting. Therefore, a complicated manufacturing is not needed on the pump body. In other words, the present configuration may reduce a working on the pump body to a small quantity and thereby to enable to reduce a manufacturing cost. Furthermore, the retaining member retains the seal member, and additionally, restricts the plunger from falling out of the cylinder when being mounted to the side of an engine (i.e., when being mounted to the engine or to a peripheral component related to the engine). Therefore, the present configuration may reduce a number of components compared with a conventional art such as Patent Document 1. It is noted that, the configuration of Patent Document 1 may require to equip a component to retain a seal member separately from a component to restrict a plunger from falling out of a cylinder. Therefore, the configuration of Patent Document 1 may require a larger number of components.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A high-pressure fuel pump comprising:
   a pump body including a pump inserted portion, which is configured to be inserted in a pump mount hole on a side of an engine;
   a cylinder extending in an axial direction of the pump body, the cylinder having a compression chamber on one end side in the axial direction, the cylinder opening in an axial end surface of the pump inserted portion on an other end side in the axial direction;
   a plunger inserted in the cylinder, the plunger configured to be actuated by a cam, which is equipped to a shaft on the side of the engine, and movable back and forth in the cylinder;
   a seal member configured to restrict fuel in the compression chamber from leaking through a slidable gap, which is between the plunger and the cylinder, to the side of the engine, the seal member further configured to restrict lubricating oil on the side of the engine from flowing through the slidable gap into the compression chamber; and
   a retaining member configured to retain the seal member at a predetermined position in the axial direction and to restrict directly or indirectly the plunger from falling out of the cylinder when being mounted to the side of the engine, wherein
   the retaining member is press-fitted to an end of the pump inserted portion,
   the plunger has a plunger sliding portion on the one end side in the axial direction and a small-diameter tubular portion on the other end side in the axial direction,
   the small-diameter tubular portion is reduced in outer diameter relative to the plunger sliding portion to form a step between the small-diameter tubular portion and the plunger sliding portion,
   the small-diameter tubular portion is projected from an interior of the cylinder toward the cam,
   the retaining member has
       a press-fitting tubular portion on the one end side in the axial direction and
       a stepped portion on an inner circumferential periphery on the other end side relative to the press-fitting tubular portion,
   the step of the plunger is configured to make contact directly with the stepped portion and to be latched on the stepped portion to restrict the plunger from falling out, and
   the seal member is disposed on the one end side of the stepped portion in the axial direction.

2. The high-pressure fuel pump according to claim 1, wherein
   the press-fitting tubular portion is at a radially outside in the retaining member
   the press-fitting tubular portion is press-fitted to a radially outside of the pump inserted portion.

3. The high-pressure fuel pump according to claim 2, wherein
   the retaining member forms an annular sealing space with an outer circumferential periphery of the plunger, and
   the seal member is located at the sealing space.

4. The high-pressure fuel pump according to claim 2, wherein
   the pump inserted portion forms an annular sealing space with an outer circumferential periphery of the plunger, and
   the seal member is located at the sealing space.

5. The high-pressure fuel pump according to claim 4, wherein
   the press-fitting tubular portion is at a radially inside in the retaining member
   the press-fitting tubular portion is press-fitted to a radially inside of the pump inserted portion.

6. The high-pressure fuel pump according to claim 1, wherein
   the step of the plunger is configured to make contact directly with the stepped portion without making contact with the sealing member and to be latched on the stepped portion to restrict the plunger from falling out.

7. A high-pressure fuel pump comprising:
a pump body including a pump inserted portion, which is configured to be inserted in a pump mount hole on a side of an engine;
a cylinder extending in an axial direction of the pump body, the cylinder having a compression chamber on one end side in the axial direction, the cylinder opening in an axial end surface of the pump inserted portion on an other end side in the axial direction;
a plunger inserted in the cylinder, the plunger configured to be actuated by a cam, which is equipped to a shaft on the side of the engine, and movable back and forth in the cylinder;
a seal member configured to restrict fuel in the compression chamber from leaking through a slidable gap, which is between the plunger and the cylinder, to the side of the engine, the seal member further configured to restrict lubricating oil on the side of the engine from flowing through the slidable gap into the compression chamber; and
a retaining member configured to retain the seal member at a predetermined position in the axial direction and to restrict directly or indirectly the plunger from falling out of the cylinder when being mounted to the side of the engine, wherein
the retaining member is press-fitted to an end of the pump inserted portion,
the plunger has a plunger sliding portion on the one end side in the axial direction and a small-diameter tubular portion on the other end side in the axial direction,
the small-diameter tubular portion is reduced in outer diameter relative to the plunger sliding portion to form a step between the small-diameter tubular portion and the plunger sliding portion,
the small-diameter tubular portion is projected from an interior of the cylinder toward the cam,
the retaining member has
a press-fitting tubular portion on the one end side in the axial direction and
an annular groove on an internal periphery on the other end side relative to the press-fitting tubular portion,
the annular groove is equipped with a snap ring, and
the step of the plunger is configured to make contact directly with the snap ring and to be latched on the snap ring to restrict the plunger from falling out.

8. The high-pressure fuel pump according to claim 7, wherein
the retaining member has a press-fitting tubular portion at a radially outside on the one end side in the axial direction, and
the press-fitting tubular portion is press-fitted to a radially outside of the pump inserted portion.

9. The high-pressure fuel pump according to claim 7, wherein
the retaining member has a press-fitting tubular portion at a radially inside on the one end side in the axial direction, and
the press-fitting tubular portion is press-fitted to a radially inside of the pump inserted portion.

10. The high-pressure fuel pump according to claim 8, wherein
the retaining member forms an annular sealing space with an outer circumferential periphery of the plunger, and
the seal member is located at the sealing space.

11. The high-pressure fuel pump according to claim 8, wherein
the pump inserted portion forms an annular sealing space with an outer circumferential periphery of the plunger, and
the seal member is located at the sealing space.

12. The high-pressure fuel pump according to claim 7, wherein
the step of the plunger is configured to make contact directly with the snap ring without making contact with the sealing member and to be latched on the snap ring to restrict the plunger from falling out.

* * * * *